(12) United States Patent
Vandeven et al.

(10) Patent No.: US 8,201,388 B1
(45) Date of Patent: *Jun. 19, 2012

(54) SENSOR FOR A HEADER HEIGHT CONTROL SYSTEM

(75) Inventors: Michael L. Vandeven, LeClaire, IA (US); Daniel M. Heim, Port Byron, IL (US); Dennis P. Silver, Geneseo, IL (US); Duane M. Bomleny, Geneseo, IL (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/098,666

(22) Filed: May 2, 2011

(51) Int. Cl.
*A01D 41/14* (2006.01)
*A01D 46/08* (2006.01)
*A01D 75/28* (2006.01)

(52) U.S. Cl. .................................. 56/10.2 E

(58) Field of Classification Search ............... 56/10.2 E, 56/10.2 R, DIG. 3, DIG. 10, DIG. 15; 172/4
See application file for complete search history.

(56) References Cited

U.S. PATENT DOCUMENTS

| | | | | |
|---|---|---|---|---|
| 3,163,974 | A * | 1/1965 | Mack | 56/10.2 E |
| 3,611,286 | A * | 10/1971 | Cleveland | 340/436 |
| 3,886,718 | A * | 6/1975 | Talbot | 56/208 |
| 3,953,959 | A * | 5/1976 | Decruyenaere | 56/208 |
| 4,211,057 | A * | 7/1980 | Dougherty et al. | 56/10.2 E |
| 4,723,608 | A * | 2/1988 | Pearson | 172/430 |
| 5,090,184 | A * | 2/1992 | Garter et al. | 56/10.2 E |
| 5,115,628 | A * | 5/1992 | Garter et al. | 56/10.2 E |
| 6,202,395 | B1 * | 3/2001 | Gramm | 56/10.2 E |
| 6,289,659 | B1 * | 9/2001 | Fox | 56/10.2 E |
| 6,516,595 | B2 * | 2/2003 | Rhody et al. | 56/10.2 E |
| 6,523,333 | B2 * | 2/2003 | Metzger | 56/10.2 E |
| 6,530,197 | B1 * | 3/2003 | Christensen et al. | 56/10.2 E |
| 6,588,187 | B2 * | 7/2003 | Engelstad et al. | 56/10.2 E |
| 6,883,299 | B1 * | 4/2005 | Gramm | 56/10.2 E |
| 7,222,474 | B2 * | 5/2007 | Rayfield et al. | 56/10.2 E |
| 7,310,931 | B2 * | 12/2007 | Gramm | 56/208 |
| 7,647,753 | B2 * | 1/2010 | Schlipf | 56/10.2 E |
| 7,730,700 | B2 * | 6/2010 | Nathan et al. | 56/10.2 E |
| 2005/0028504 | A1 * | 2/2005 | Gramm | 56/208 |
| 2006/0242935 | A1 * | 11/2006 | Rayfield et al. | 56/10.2 E |
| 2008/0264025 | A1 * | 10/2008 | Ditchcreek et al. | 56/10.2 E |
| 2010/0077712 | A1 * | 4/2010 | Nathan et al. | 56/10.2 E |
| 2011/0271653 | A1 * | 11/2011 | Vandeven | 56/10.2 E |

* cited by examiner

*Primary Examiner* — Arpad Fabian-Kovacs

(57) ABSTRACT

A header height sensor (102) for an agricultural harvester has an elongate sensor arm (112), a reversing joint (114) and a rotary sensor (116) mounted to a bracket (106) that is fixed to a point (100) of a harvesting head. The reversing joint includes a housing (152) that limits the deflection of the sensor in a lateral direction.

7 Claims, 3 Drawing Sheets

SENSOR FOR A HEADER HEIGHT CONTROL SYSTEM

RELATED APPLICATIONS

This application is related to and claims priority to U.S. patent application Ser. No. 12/776,115, filed May 7, 2010, which is incorporated herein by reference for all that it teaches.

FIELD OF THE INVENTION

The invention relates generally to agricultural combines. It relates in particular to header height control systems. More particularly it relates to sensors for indicating the height of a harvesting head for a combine.

BACKGROUND OF THE INVENTION

Agricultural combines are typically equipped with a harvesting head that is disposed at the front of the vehicle to engage crop as the vehicle travels through the field, separate it from the ground, and convey it to the threshing, separating, and cleaning systems within the combine vehicle itself.

One of the problems faced by agricultural combines is the necessity of keeping the harvesting head as close as possible to the ground in order to harvest as much of the crop as possible. At the same time, the harvesting head (if it is a corn head) should not be permitted to dig into the ground or significant damage may result.

The solution to this problem has been the provision of a header height control system to sense the height of the header above the ground and to maintain the header at a constant height. This is done automatically as the vehicle travels through the field with the ground rising and falling underneath the header and the combine.

These systems were originally mechanical, and later mechanical-hydraulic. More recently, these systems have used electrical header height sensors that are connected to digital microprocessors. The digital microprocessors are programmed to receive height signals from the sensors and to control electrohydraulic valves that responsively raise and lower the harvesting head as appropriate.

One problem with these sensors is their ability to handle the rough treatment they receive. The sensors are typically contact sensors with one end attached to the header and the other end dragging over the ground. The combine and header often change direction, from forward to reverse to steering side-to-side. Furthermore, the header can be dropped flat against the ground, smashing the sensor between the header and the ground if no space is provided. All of this can cause severe damage unless the sensor is made large and strong enough (or small and flexible enough) to avoid injury.

U.S. Pat. No. 6,202,395 discloses a header height sensor that is mounted near the forward end of a row crop header point. "Points" or "dividers" are crop row separators designed to travel almost on the ground and to separate two adjacent rows of crop. The point separates the rows of crop the way the tine of a comb separates hair. The sensor is fixed to the underside of a point and includes a flexible sensor arm (40) that is attached to a rotation sensor (48) and has a ball (46) that engages the ground. The sensor arm is made flexible by providing a coil spring (42) as part of its length. In an alternative embodiment, the same flexible sensor arm is attached to a bracket (62) that is disposed between the flexible sensor arm (96) with coil spring (98). It also has a ball (102) that engages the ground.

This arrangement suffers from several problems. The coil spring (42, 98) that makes the sensor arm (40, 96) flexible is prone to collect plant matter in its coils when it is flexed in a field. As a result it never returns to its original shape and no longer indicates the proper height above ground. Furthermore, the ball (46, 102) tends to gather dirt and plant matter due to its spherical shape. Even further, the ball, being symmetric, has no steering function and lets the lower portion of the arm be deflected left and right over the ground. This lateral deflection poses a particular problem since the shaft of the arm is flexible, and therefore can be bent easily when the ball at the end of the arm is deflected left and right by the soil. This leads to erroneous readings.

U.S. Pat. No. 6,883,299 and U.S. Pat. No. 7,310,931 are directed to a header height sensor that solves three identified problems. First, some headers do not have recesses for receiving sensors when the harvesting head is lowered to the ground. Second harvesting heads are operated closer to the ground than they were before and therefore provide little space between the bottom of the harvesting head and the ground in which the sensor can operate. Third, as the header gets closer to the ground it is beneficial to sense the height of the harvesting head farther forward, i.e. closer to the front of the harvesting head, thereby permitting the height controller to sense the height and correct the height sooner. To solve these problems, the device has a sensor arm with a special curvature that causes the ground contact point of the arm to move forward toward the front of the harvesting head as the harvesting head gets closer to the ground. The arm is thin and flexible with a tapered cross section so that it can be flattened between the flat ground and the flat bottom of the harvesting head. The arm is made of polyurethane to permit it to be severely bent without being damaged and to return to its original shape. The arm is so light that it requires a supplemental spring to hold the arm down against the ground.

The sensor arrangement of the '299 and '931 patents is suited to platform harvesting heads with flat bottoms that drag along the ground. The sensor arm of these patents avoids using the coil spring of the '395 patent for flexibility, but the resulting curved and flexible arm of the '299 patent is thin and easily damaged.

PURPOSE OF THE INVENTION

The purpose underlying this invention is seen in the need to provide a header height sensor that is accurate and rigid, and avoids the need for flexibility of the prior art arrangements.

SUMMARY OF THE INVENTION

The problem is solved according to the invention at least by the teaching of patent claim 1, where the further patent claims cite characteristics that further develop the solution to great advantage.

In accordance with a first aspect of the invention, a header height sensor for a harvesting head of an agricultural combine, is provide, the header height sensor comprising an elongate sensor arm having an upper end that defines an aperture configured to receive a shaft and a lower end; a reversing joint that comprises a housing configured to receive the upper end of the elongate sensor arm; the housing including a mechanical stop to prevent movement of the elongate sensor arm with respect to the housing in a first direction beyond a first limit of travel, the reversing joint further comprising a pair of springs disposed on either side of the upper end, the pair of springs being coupled to the housing and to the upper end to push the upper end against the mechanical stop, wherein a shaft having first and second ends extends through both springs and through the aperture in the elongate sensor arm, and is supported on the housing at the first and second ends; a bracket configured to be fixed to point and configured to support an upper portion of the reversing joint for relative rotational movement about a laterally extending longitudinal axis; and a rotary position sensor coupled to the bracket and coupled to reversing joint such that movement of the reversing joint with respect to the rotary position sensor causes an electrical signal from rotary position sensor to change as a function of the relative rotation; wherein the mechanical stop abuts the sensor arm on three sides.

The mechanical stop may define a recess having two facing sidewalls, a bottom, and an opening.

The two facing sidewalls may be spaced apart a distance sufficient to receive and support the sensor arm.

The two facing sidewalls may abut the sensor arm when side loads are applied to the sensor arm to reduce movement of the sensor arm with respect to the housing in a direction parallel to the axis of the shaft.

The sensor arm may be generally straight with a circular cross-section.

The very end of the sensor arm may be elevated above the ground when the lower end of the sensor arm rests upon the ground.

The lower end of the sensor arm may be hardened and a portion of the arm that is configured to abut the recess may not be hardened.

In accordance with a second aspect of the invention, a header height sensor for a harvesting head of an agricultural combine is provided, the header height sensor comprising: an elongate sensor arm having an upper end and a lower end; a reversing joint comprising a housing configured to receive and pivotally support the upper end of the elongate sensor arm for relative movement about a first axis of rotation with respect to the housing; a bracket pivotally coupled to the housing and adapted to be fixed to a point of the harvesting head; wherein said housing defines a first mechanical stop having a recess that receives the sensor arm and abuts the sensor arm on two opposing sides when the sensor arm is flexed in opposing directions that are parallel to the first axis of rotation.

The recess may have two facing sidewalls, a bottom, and an opening.

The two facing sidewalls may be spaced apart a distance sufficient to receive and support the sensor arm.

The two facing sidewalls may abut the sensor arm when side loads are applied to the sensor arms to reduce movement of the sensor arm with respect to the housing in a direction parallel to the first axis of rotation.

The sensor arm may be generally straight with a circular cross-section.

The very end of the sensor arm may elevated above the ground when the lower end of the sensor arm rests upon the ground.

The lower end of the sensor arm may be hardened and a portion of the arm that is configured to abut the recess may not be hardened.

DETAILED DESCRIPTION OF THE PREFERRED EMBODIMENTS

Figure 1:
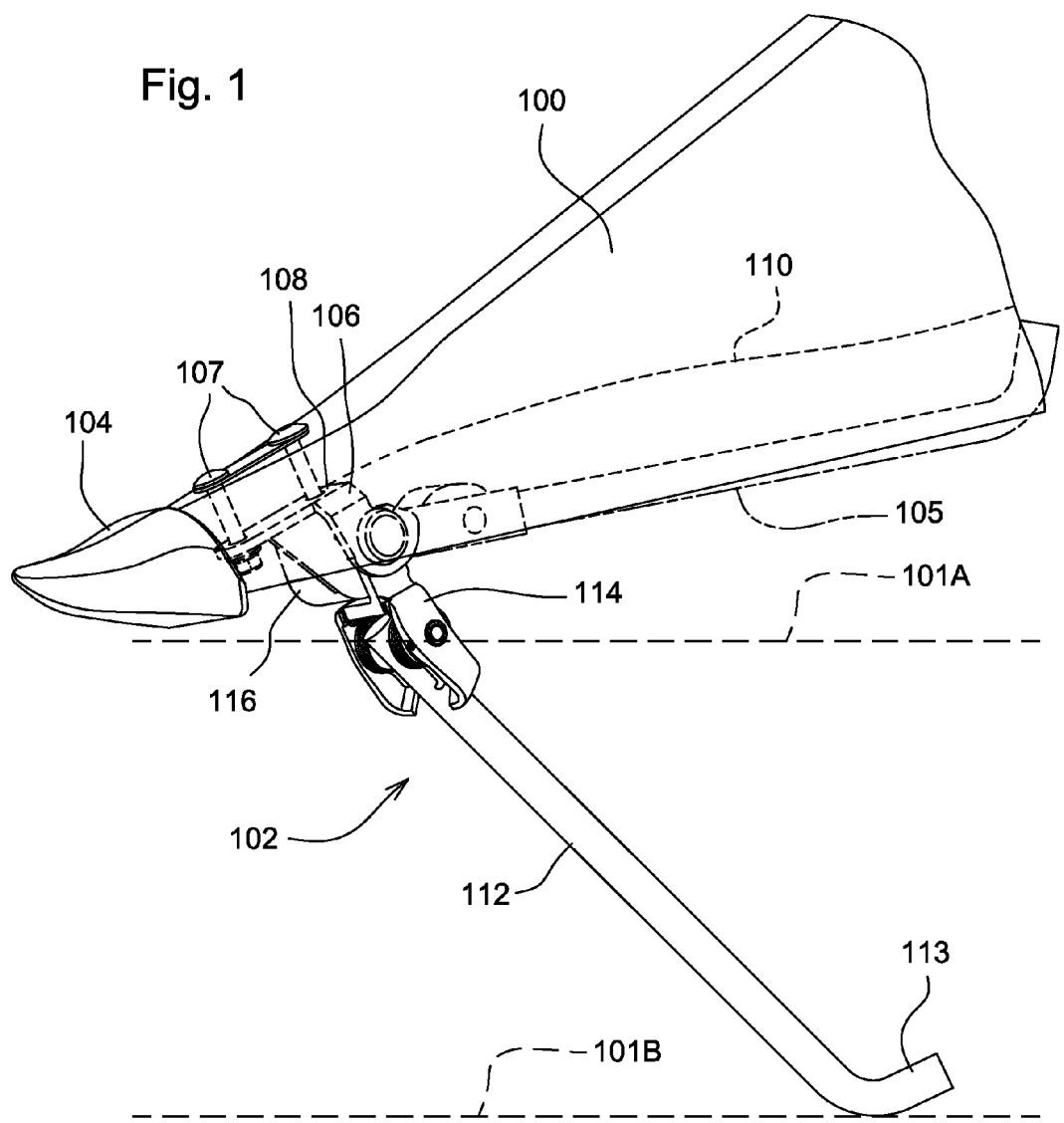
FIG. 1 illustrates a perspective view of a point of a corn head with the header height sensor in accordance with the present invention.

In FIG. 1, a point 100 for a row crop harvesting head (a corn head) is illustrated together with a header height sensor 102 mounted to a forward end thereof. The point 100 is typically made out of a rotomolded plastic, such as polyethylene or polypropylene.

A metal tip 104 is fixed to a forward end of the point 100 to provide a wear surface for the point 100 whenever it skids across the ground. Header height sensor 102 is fixed to point 100 immediately behind metal tip 104 by threaded fasteners 107. Header height sensor 102 includes a bracket 106 having a planar upper surface 108. This bracket 106 is fixed to a planar surface of point 100 that faces downward and is formed in a downwardly opening cavity 110 inside point 100.

Header height sensor 102 includes an elongate sensor arm 112 that is rigid and that is coupled to a reversing joint 114, which in turn is coupled to a position sensor 116 which in turn is coupled to the bracket 106.

The sensor 102 first touches the ground when the ground is at the 101B level. As the harvesting head (and hence point 100) is lowered, the header height sensor 102 pivots counterclockwise (as shown in FIG. 1) against the ground until the ground rises to the 101A level. At this point the header height sensor 102 is just beginning to be received in the cavity 110. The header and point can go no further, however, since the metal tip 104 of point 100 is touching the ground.

Even with the tip of the point resting on the ground, however, the elongate sensor arm 112 is not compressed between the harvesting head and the ground. The elongate sensor arm 112 can still be freely rotated counterclockwise as shown by its upper most position (illustrated in phantom lines). Elongate sensor arm 112 is free to pivot between its uppermost position 105 to a lower position at which the rear end of the elongate sensor arm 112 touches the ground at the highest level 101A of the ground. The elongate sensor arm 112 can therefore be made quite stiff and rigid.

Elongate sensor arm 112 is straight, having a short upwardly curved tip 113 that rests upon the ground. It is preferably made out of steel rod stock that is circular in cross-section. The lower portion that is dragged along the ground is preferably hardened to resist frictional wear. The upper portion is preferably not hardened so it can bend and relieve sideways loads before the other sensor components bend. The rest of the sensor bends when side loads are applied to the end of the elongate sensor arm 112.

The short upwardly curved tip 113 is turned upward at the end as shown in FIG. 1, such that the surface of elongate sensor arm 112 contacts the ground at a tangent point. If the combine is moved in reverse, this short upwardly curved tip 113 serves to keep the elongate sensor arm 112 skidding along the ground rather than digging into the ground.

As the corn head is lowered toward the ground, the point of contact the point of contact moves rearward as the elongate sensor arm 112 pivots upward and counterclockwise about bracket 106. The point of contact with the ground moves rearward where it is better protected and less able to be snagged on plant stalks.

To make this rearward movement easier, the cavity 110 in the bottom of the point is configured to receive elongate sensor arm 112 without resistance, and not to press elongate sensor arm 112 against the ground. By avoiding ground deformation in this manner, the hollow point permits the elongate sensor arm 112 to be made thicker, heavier, rigid, inflexible and thus weighty enough to follow the ground without any downward biasing means.

Figure 2:
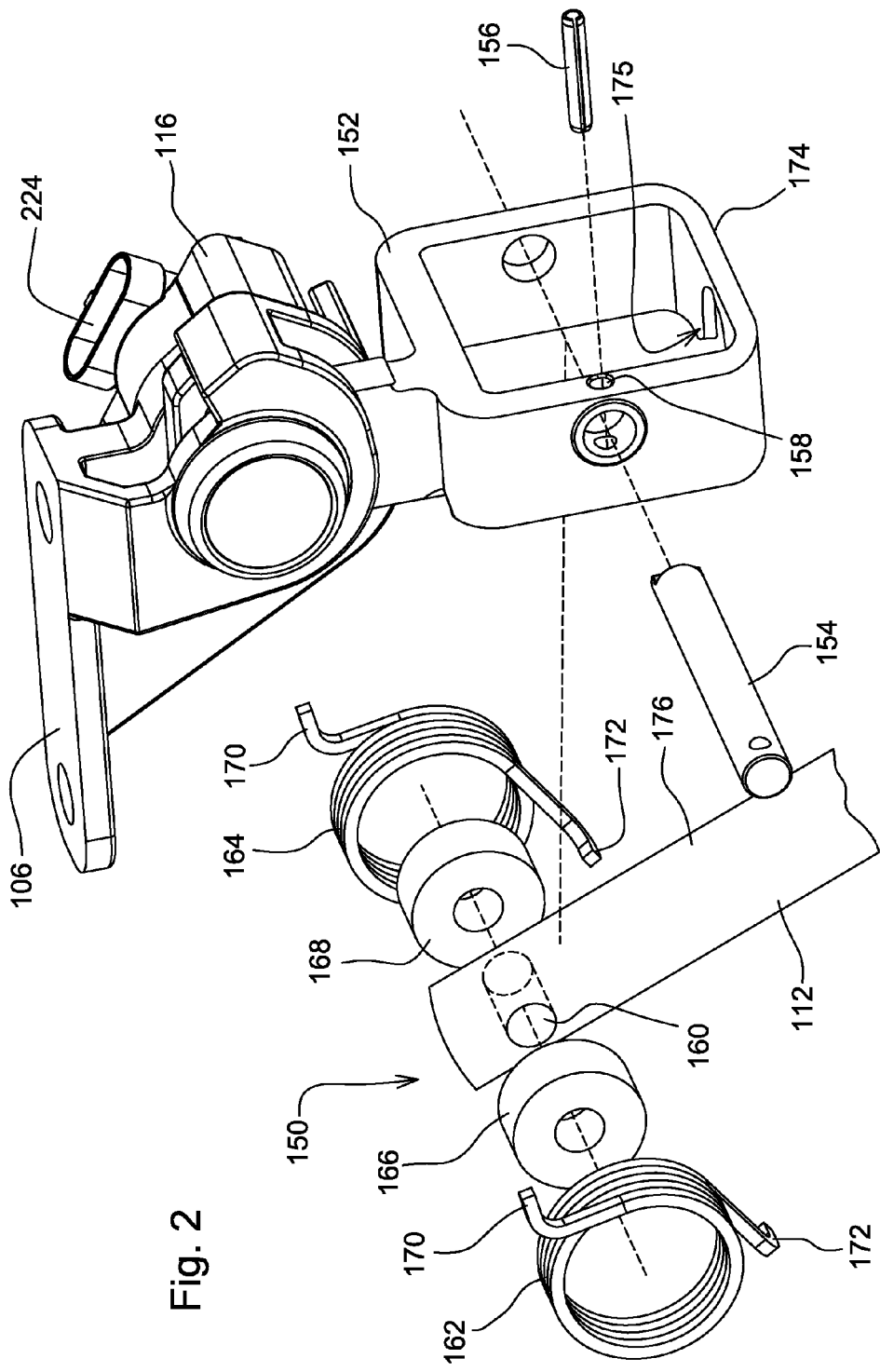
FIG. 2 is a partially exploded perspective view of the sensor element arrangement of the header height sensor of FIG. 1.

Referring now to FIG. 2, the upper end 150 of elongate sensor arm 112 is supported in reversing joint 114 which comprises a housing 152 and associated elements that permit the lower end of elongate sensor arm 112 to be rotated in the reverse direction (i.e. clockwise in FIG. 1) to relieve strain and prevent damage to header height sensor 102 when the elongate sensor arm 112 is pulled in a clockwise direction (in FIG. 1).

Housing 152 supports a shaft 154 at both ends. A spring pin 156 is inserted through an aperture 158 in housing 152 to hold shaft 154 in position, supported at each end by housing 152. Upper end 150 has an aperture 160 passing therethrough that is configured to receive shaft 154. This arrangement supports upper end 150 for pivotal movement about shaft 154 within the housing 152. Two coil springs 162, 164 are disposed on opposite sides of upper end 150. Springs 162, 164 are supported on spring supports 166, 168 that extend in a direction generally parallel to shaft 154 from opposite sides of upper end 150. Spring supports may be formed integral with housing 150 or may be separate components supported on shaft 154. They support the springs on either side of the elongate sensor arm 112 and absorb side loads applied by elongate sensor arm 112 that would otherwise compress and possibly damage the springs. These side loads are communicated to the side walls of housing 152 that support the ends of shaft 154.

The arrangement of dual springs and shaft supported at both ends in the housing with the upper end 150 held therebetween is capable of resisting greater forces than the cantilevered shafts of the '395 patent.

Each coil spring 162, 164 has an upper spring end 170, and a lower spring end 172 that are configured to grip housing 152 and upper end 150, respectively, to apply a torque between housing 152 and upper end 150, thereby holding elongate sensor arm 112 in a predetermined position with respect to housing 152.

The predetermined position is determined by a mechanical stop 174 that extends across the rear of housing 152. Mechanical stop 174 provides an abutting surface for upper end 150. Stop 174 has a recess 175 that defines a slot extending around the upper ends 150 of elongate sensor arm 112. The sidewalls of this recess 175 abut the sides of elongate sensor arm 112, and act as a fulcrum about which elongate sensor arm 112 pivots when flexed side-to-side by the ground. Without the sidewalls of slot 175 functioning as a fulcrum, a torque generated by a lateral force applied to the end 113 of elongate sensor arm 112 would be applied directly to shaft 154, possibly causing shaft 154 to shear adjacent to elongate sensor arm 112 where the shear forces are greatest.

With the elongate sensor arm 112 unsupported against lateral deflection as shown in related U.S. patent application Ser. No. 12/776,115, and in the U.S. Pat. No. 6,202,395, the resisting torque is a force couple applied by the shaft 154 to elongate sensor arm 112 at the aperture 160. The forces between elongate sensor arm 112 and shaft 154 must be very large to resist the torque applied by lateral forces acting on the bottom of elongate sensor arm 12. Since the length of the torque am is just the thickness of the elongate sensor arm 112 where shaft 14 passes through it.

The sidewalls of recess 175 substantially eliminate the forces between elongate sensor arm 112 and shaft 154 and therefore the possible shearing of shaft 194. Instead, when a lateral force is applied to the bottom of elongate sensor arm 112 the sidewall of recess 175 applies a first reactive force to the side of elongate sensor arm 112, and the sidewall of housing 153 applies a second reactive force to the upper ends of elongate sensor arm 112 that is opposite in direction and magnitude to the first reactive force and generally parallel to the longitudinal axis of shaft 154.

Housing 152 is a unitary body with a closed aperture that supports the upper end 150 of elongate sensor arm 112, supporting both ends of the shaft 154 and springs 162, 164 and spring supports 175, 177. This completely-enclosing box-like structure surrounding these components on four sides in combination with the sidewalls of recess 175 removes the shearing forces from shaft 154 and transmits them to housing 150, thence to bracket 106, and thence to point 100.

When elongate sensor arm 112 is rotated in a counterclockwise direction (in FIG. 2) with respect to housing 152, a shank portion 176 of upper end 150 fits into recess 175 abutting the bottom and sidewalls of the recess of mechanical stop 174 and prevents further counterclockwise rotation with respect to housing 152.

Each of the two coil springs 162, 164 hold upper end 150 in this predetermined abutted position with respect to housing 152. The upper spring ends 170 of the two coil springs 162, 164 abut housing 152. The lower spring ends 172 of the two coil springs 162, 164 abut shank portion 176. The two coil springs 162, 164 are placed in tension to ensure that shank 176 makes abutting contact with mechanical stop 174 during normal operation.

Under some operating conditions, such as when the agricultural combine stops and travels on a reverse direction, the lowermost end of elongate sensor arm 112 can dig into the ground and be pulled forward as the ground moves forward underneath the harvesting head and the point 100. When this happens, the clockwise torque (in FIG. 2) acting on the bottom of elongate sensor arm 112 causes it to rotate clockwise with respect to housing 152, and to pull away from mechanical stop 174.

When this happens, the two coil springs 162, 164 are tightened by the movement of elongate sensor arm 112 with respect to housing 152. The elongate sensor arm rotates about shaft 154 which is pinned to housing 152 in order to permit this to happen. Furthermore, the aperture 160 of elongate sensor arm 112 in which shaft 154 is received is made oblong in the direction of the longitudinal extent of elongate sensor arm 112. This permits the elongate sensor arm to pivot slightly side to side (i.e. in a direction perpendicular to the forward or reverse direction of travel of the combine) as the elongate sensor arm 112 is pulled forward by the ground. This additional play permits the elongate sensor arm 112 to be deflected slightly side to side by the ground as the ground drags the elongate sensor arm 112 forward, away from mechanical stop 174. This additional slack is beneficial by permitting elongate sensor arm 112 to move from side to side without breaking shaft 154.

Figure 3:
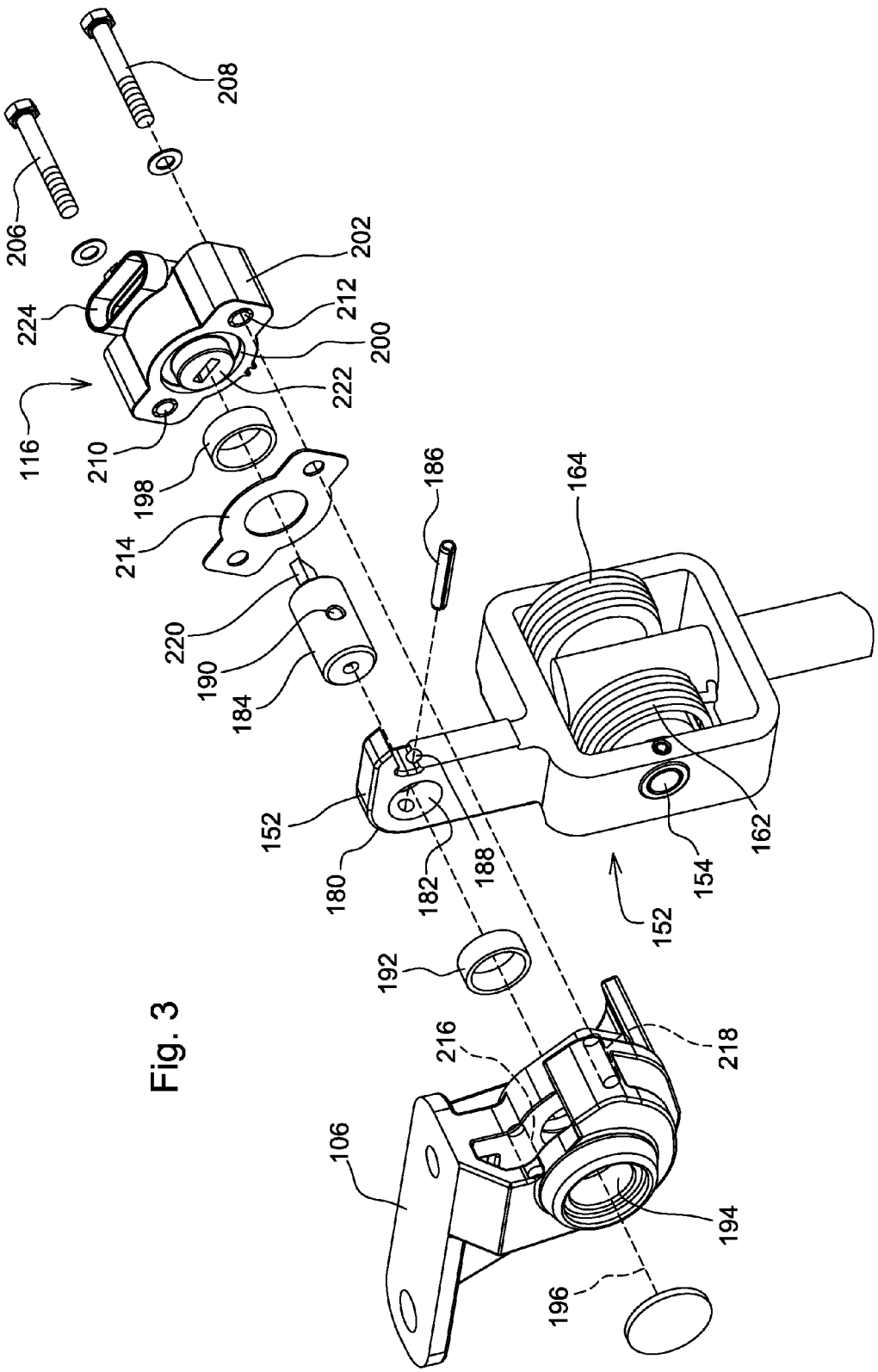
FIG. 3 is a partially exploded perspective view of a reversing joint of the header height sensor of FIGS. 1-2.

In FIG. 3, housing 152 has a mount 180 that extends upward therefrom. Mount 180 is in the form of a planar member having a laterally extending aperture 182 passing therethrough. A shaft 184 extending laterally and generally parallel to shaft 154 is disposed within aperture 182 and is pinned in place with retaining pin 186. Retaining pin 186 extends through an aperture 188 in mount 180, and through an aligned aperture 190 in shaft 184. A bearing 192 in the form of a hollow cylinder or bushing extends about the left end (in FIG. 3) of shaft 184, and is in turn received in an aperture 194 in bracket 106. Aperture 194 also extends laterally with respect to point 100. This arrangement permits housing 152 to rotate about longitudinal axis 196 that is the central axis of aperture 194, bearing 192, aperture 182, and shaft 184.

The other end of shaft 184 is supported on a bearing 198 made in the form of a hollow cylinder. Bearing 198 is supported in an aperture 200 that is formed in the body 202 of a rotary position sensor 116. Body 202 is bolted to bracket 106 with two threaded fasteners 206, 208 that extend through the pass-through clearance holes 210, 212, respectively, in body 202, through a gasket 214 that is disposed between bracket 106 and body 202, and thence into threaded holes 216, 218, respectively, that are formed in bracket 106. When tightened, fasteners 206, 208 compress gasket 214, and hold body 202 rigidly fixed to bracket 106. The right end (in FIG. 3) of shaft 184 also has an engagement member 220 that is configured to be received in rotary sensor element 222.

The tolerances between shaft 184, and bearings 192, 198, permit housing 152 to rotate about axis 196 with respect to bracket 106 and body 202 as the lower end of elongate sensor arm 112 travels over the ground being raised and lowered as it follows fluctuations in the terrain. Whenever housing 152 rotates, it causes sensor element 222 to rotate an identical amount with respect to body 202 of rotary position sensor 116. This rotation causes the rotary position sensor 116 to generate a signal indicative of the position or the change in position of rotary position sensor element 222 with respect to body 202. Since rotary sensor element 222 rotates identically with housing 152, the signal generated by rotary position sensor 116 indicates the rotation of housing 152, and therefore elongate sensor arm 112 as well, with respect to bracket 106.

Thus, the signal provided by rotary position sensor 116 indicates the distance between point 100 and the ground. An electrical connector 224 is provided on housing 202 to provide an electrical connection between the sensor elements disposed inside rotary position sensor 116 and an electronic header height control circuit disposed elsewhere on the harvesting head or on the agricultural combine itself.

The invention claimed is:

1. A header height sensor for a harvesting head of an agricultural combine, the header height sensor comprising:
   an elongate sensor arm (112) having an upper end (150) that defines an aperture (160) configured to receive a shaft (154) and a lower end;
   a reversing joint (114) that comprises a housing (152) configured to receive the upper end of the elongate sensor arm (112); the housing (152) including a mechanical stop (174) to prevent movement of the elongate sensor arm (112) with respect to the housing (152) in a first direction beyond a first limit of travel, the reversing joint (114) further comprising a pair of springs (162, 164) disposed on either side of the upper end (150), the pair of springs (162, 164) being coupled to the housing (152) and to the upper end (150) to push the upper end (150) against the mechanical stop (174), wherein a shaft (154) having first and second ends extends through both springs (162, 164) and through the aperture (160) in the elongate sensor arm (112), and is supported on the housing (152) at the first and second ends;
   a bracket (106) configured to be fixed to a point (100) and configured to support an upper portion of the reversing joint (114) for relative rotational movement about a laterally extending longitudinal axis (196); and
   a rotary position sensor (116) coupled to the bracket (106) and coupled to reversing joint (114) such that movement of the reversing joint (114) with respect to the rotary position sensor (116) causes an electrical signal from rotary position sensor (116) to change as a function of the relative rotation, and wherein the mechanical stop (174) abuts the elongate sensor arm (112) on three sides of the sensor arm.

2. The header height sensor of claim 1, wherein the mechanical stop defines a recess (175) having two facing sidewalls, a bottom, and an opening.

3. The header height sensor of claim 2, wherein the two facing sidewalls are spaced apart a distance sufficient to receive and support the elongate sensor arm (112).

4. The header height sensor of claim 2, wherein the two facing sidewalls abut the elongate sensor arm (112) when side loads are applied to the elongate sensor arm to reduce movement of the elongate sensor arm (112) with respect to the housing (152) in a direction parallel to the axis of the shaft (154).

5. The header height sensor of claim 1, wherein the elongate sensor arm (112) is generally straight with a circular cross-section.

6. The header height sensor of claim 5, wherein a very end of the elongate sensor arm (112) is elevated above the ground when the lower end of the elongate sensor arm rests upon the ground.

7. The header height sensor of claim 6, wherein the lower end of the elongate sensor arm is hardened and a portion of the arm that is configured to abut the recess (175) is not hardened.

* * * * *